United States Patent
Naim et al.

(10) Patent No.: US 9,596,071 B1
(45) Date of Patent: Mar. 14, 2017

(54) ENHANCED TTI BUNDLING IN FDD MODE

(71) Applicant: Sprint Spectrum L.P., Overland Park, KS (US)

(72) Inventors: Muhammad Naim, Sterling, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 438 days.

(21) Appl. No.: 14/269,881

(22) Filed: May 5, 2014

(51) Int. Cl.
*H04L 5/00* (2006.01)
*H04L 5/14* (2006.01)

(52) U.S. Cl.
CPC .......... *H04L 5/1438* (2013.01); *H04L 5/0055* (2013.01); *H04L 5/1461* (2013.01)

(58) Field of Classification Search
None
See application file for complete search history.

(56) References Cited

U.S. PATENT DOCUMENTS

| | | | | |
|---|---|---|---|---|
| 8,553,591 B2 * | 10/2013 | Jiang | ...................... | H04W 72/04 370/280 |
| 9,282,567 B2 * | 3/2016 | Golitschek Edler Von Elbwart | ................ | H04B 7/2656 |
| 2012/0020309 A1* | 1/2012 | Malladi | ............. | H04W 72/0446 370/329 |
| 2012/0057476 A1* | 3/2012 | Chan | ...................... | H04W 88/06 370/252 |
| 2013/0083753 A1* | 4/2013 | Lee | ................... | H04W 72/0453 370/329 |
| 2013/0142175 A1* | 6/2013 | Manssour | ......... | H04W 72/1252 370/336 |
| 2013/0242824 A1* | 9/2013 | Lee | ....................... | H04L 1/1819 370/281 |
| 2013/0242889 A1 | 9/2013 | Khoryaev et al. | | |
| 2013/0250924 A1* | 9/2013 | Chen | ..................... | H04L 1/1819 370/336 |
| 2013/0258977 A1* | 10/2013 | Kim | ...................... | H04L 5/0053 370/329 |
| 2013/0343273 A1* | 12/2013 | Barbieri | ................ | H04L 1/1822 370/328 |
| 2014/0003374 A1 | 1/2014 | Kuo | | |
| 2014/0010105 A1* | 1/2014 | Sakabe | ................. | H04W 72/08 370/252 |

(Continued)

FOREIGN PATENT DOCUMENTS

EP  2 635 082 A1  9/2013

*Primary Examiner* — Robert C Scheibel
*Assistant Examiner* — Gautam Sharma

(57) ABSTRACT

A base station and a user equipment (UE) device may communicate over an air interface using a frequency division duplexing (FDD) configuration that provides a time sequence of consecutive subframes for both uplink and downlink communications. A transmitter (either the UE device or the base station) may select a sequence of N subframes for N transmissions of the same data to a receiver using transmission time interval (TTI) bundling, wherein successive subframes in the sequence are separated by one or more subframes. The transmitter may transmit the data M times (where M<N) and may receive an acknowledgement during the one or more subframes between subframe M and subframe M+1 in the sequence that the receiver has successfully received the data. In response to the acknowledgement, the transmitter may cancel transmission of the data in each subframe of the sequence occurring after subframe M.

15 Claims, 8 Drawing Sheets

(56) References Cited

U.S. PATENT DOCUMENTS

| | | |
|---|---|---|
| 2014/0016582 A1 | 1/2014 | Prakash et al. |
| 2014/0040694 A1 | 2/2014 | Verma et al. |
| 2014/0098782 A1 | 4/2014 | Shirazi et al. |
| 2015/0029923 A1* | 1/2015 | Xu .................. H04W 76/048 370/311 |
| 2015/0341858 A1* | 11/2015 | Hwang ............ H04W 52/0225 370/311 |
| 2015/0351092 A1* | 12/2015 | Seo .................. H04L 5/0046 370/329 |
| 2016/0128076 A1* | 5/2016 | Langereis ............ H04L 1/0009 370/336 |

* cited by examiner

ENHANCED TTI BUNDLING IN FDD MODE

BACKGROUND

In some wireless communication systems, when data that is transmitted by a transmitting entity to a receiving entity is not received by the receiving entity, or is received by the receiving entity with one or more errors, the data may be re-transmitted. The re-transmission of data could occur either automatically or in response to feedback from the receiving entity. For example, in Long Term Evolution (LTE) air interfaces, a Hybrid Automatic Repeat Request (HARQ) procedure is used. In the HARQ approach, after a transmitting entity has transmitted a block of data, the transmitting entity waits to receive a HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data. The transmitting entity may also re-transmit the data if the transmitting entity does not receive any HARQ response within a certain period of time.

This re-transmission approach can allow data to be successfully transmitted from a transmitting entity to a receiving entity even when there is a substantial probability that the transmitted data will be received with one or more errors, for example, because of poor radio frequency (RF) conditions. Specifically, the data can be re-transmitted multiple times until the data is received without errors. This re-transmission approach, however, also increases latency. For example, there can be a period of delay between when the transmitting entity transmits data and when the transmitting entity receives a NACK response from the receiving entity and another period of delay between when the transmitting entity receives the NACK response and when the transmitting entity begins re-transmitting the data.

In order to reduce the delay associated with re-transmitting data, LTE supports a bundling option for data transmissions by a user equipment (UE) device in the Physical Uplink Shared Channel (PUSCH). Normally, a UE device transmits data in one transmission time interval (TTI), which corresponds to a 1 millisecond (ms) subframe, and then waits to receive a HARQ response before re-transmitting the data or transmitting additional data. However, when TTI bundling is used, the UE device transmits the same data four times in four consecutive TTIs and then waits to receive a HARQ response. In this way, the UE device can transmit four instances of the same data, which allows for more robust reception of the data, but without the delay that would be associated with the UE device transmitting the data four times and waiting for a HARQ response after each transmission.

OVERVIEW

An LTE system may use frequency division duplexing (FDD) for wireless communications between base stations and UE devices. The FDD configuration provides a time sequence of consecutive subframes for uplink communications and a substantially simultaneous time sequence of consecutive subframes for downlink communications, in which the uplink and downlink communications occur in different frequency ranges. Described herein are methods and systems that can provide enhanced TTI bundling for such FDD configurations. In one aspect of such approaches, the number of transmissions of the same data (bundle size) can be made variable. In another aspect, the transmissions do not occur in consecutive subframes but instead are separated by one or more intervening subframes. In yet another aspect, if an acknowledgement of successful receipt of the data is received during one of the intervening subframes, subsequent transmissions of the data can be cancelled.

Example embodiments provide a method for wireless communication in a wireless network using an FDD configuration. The FDD provides a time sequence of consecutive subframes for both uplink and downlink communications in which the uplink and downlink communications occur in different frequency ranges. The method involves: (a) identifying, by a transmitter, data to be transmitted to a receiver using TTI bundling; (b) obtaining, by the transmitter, a bundle size, N, to use for the TTI bundling, wherein N>1; (c) obtaining, by the transmitter, a number of intervening subframes, I, between successive transmissions of the data to the receiver, wherein I≥1; (d) selecting, by the transmitter, a sequence of N subframes for N transmissions of the data to the receiver, wherein successive subframes in the sequence are separated by I subframes; and (e) transmitting, by the transmitter, the data in at least a first subframe of the sequence of N subframes.

Example embodiments also provide an apparatus. The apparatus comprises a transceiver for transmitting and receiving wireless communications according to an FDD configuration. The FDD configuration provides a time sequence of consecutive subframes for both uplink and downlink communications in which the uplink and downlink communications occur in different frequency ranges. The apparatus further comprises: a processor; data storage; and program instructions stored in the data storage and executable by the processor to cause the apparatus to perform functions. The functions comprise: (a) identifying data to be transmitted to a receiver using TTI bundling; (b) obtaining a bundle size, N, to use for the TTI bundling, wherein N>1; (c) obtaining a number of intervening subframes, I, between successive transmissions of the data to the receiver, wherein I≥1; (d) selecting a sequence of N subframes for N transmissions of data to the receiver, wherein successive subframes in the sequence are separated by I subframes; and (e) transmitting, via the transceiver, the data in at least a first subframe of the sequence of N subframes.

DETAILED DESCRIPTION OF EXAMPLE EMBODIMENTS

1. Introduction

Disclosed herein are methods and systems that can provide enhanced TTI bundling for FDD configurations. The enhanced TTI bundling could be used by a UE device transmitting data in an uplink shared channel (e.g., a PUSCH channel). The enhanced TTI bundling could also be used for a base station transmitting data in a downlink shared channel (e.g., a PDSCH channel).

In one aspect of the enhanced TTI bundling, the bundle size can be variable. For example, a base station may determine a TTI bundle size for a particular UE device and then indicate to the UE device what bundle size to use for the TTI bundling. The base station could determine the TTI bundle size based on one or more uplink parameters, such as a signal-plus-interference-to-noise ratio (SINR) of the UE's signal at the base station, a delay budget for the UE's data or other quality of service (QoS) considerations, and/or utilization of the uplink shared channel. The bundle size that is determined in this way could be four (as with convention TTI bundling), or less than four (e.g., if the SINR is relatively high or to conserve resources if the utilization is high). In addition, some implementations could support a bundle size that is greater than four.

Similarly, a base station may determine a TTI bundle size to use when transmitting data to a UE device using TTI bundling. The base station may determine the TTI bundle size based on one or more downlink parameters, such as a SINR of the base station's signal at the UE device (which the UE device may report to the base station), a delay budget for the base station's data or other QoS considerations, and utilization of the downlink shared channel.

In another aspect of the enhanced TTI bundling, the multiple transmissions of the same data do not occur in consecutive subframes. Instead, one or more intervening subframes separate successive transmissions of the data. The number of intervening subframes to use could be determined (e.g., by the base station) using the same of similar parameters used to determine the bundle size. The one or more intervening subframes allow the receiver to transmit an acknowledgement of successful receipt of the data before the transmitter has completed all of the transmissions of the data. This can beneficially result in less latency as compared to conventional TTI bundling in which the receiver waits for all transmissions of the data to be completed before transmitting a HARQ response (either an ACK or a NACK).

In yet another aspect of the enhanced TTI bundling, the transmitter can cancel subsequent transmissions of the data if the transmitter receives an acknowledgement of successful receipt of the data during an intervening subframe. This can beneficially reduce usage of the uplink or downlink shared channel used to transmit the data as compared to conventional TTI bundling.

2. Example Communication System

Figure 1:
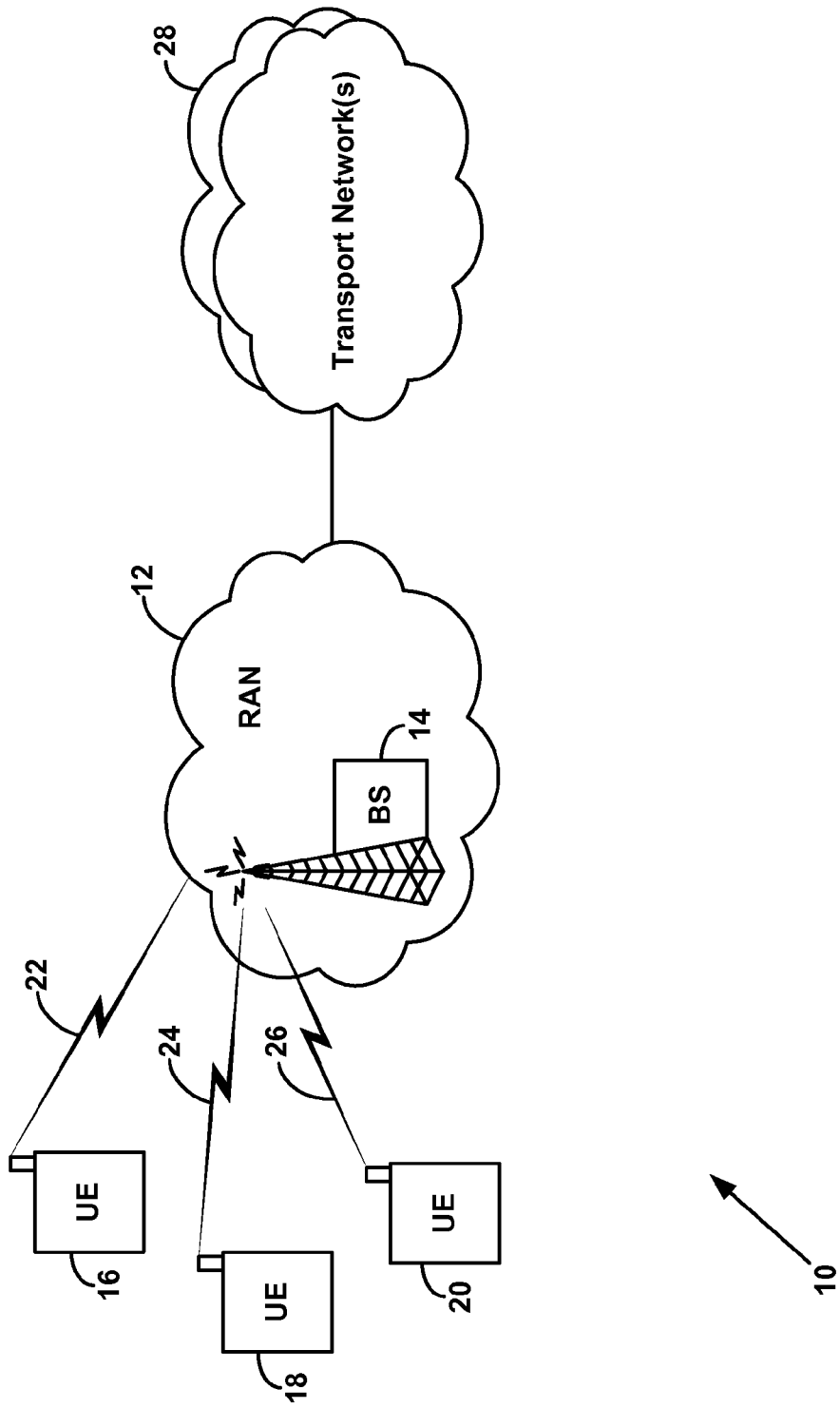
FIG. 1 is a block diagram of a communication system, in accordance with an example embodiment.

FIG. 1 is a block diagram of a communication system 10 in which exemplary embodiments may be employed. Communication system 10 includes a radio access network (RAN) 12 that includes one or more entities that can communicate over an air interface, as exemplified by base station (BS) 14. RAN 12 could also include one or more control entities, such as a base station controller (BSC) or radio network controller (RNC). BS 14 could be, for example, a base transceiver station, a wireless access point, an access node, a Node-B, or an eNodeB. Although FIG. 1 shows only one base station in RAN 12, it is to be understood that RAN 12 could include any number of base stations.

BS 14 radiates to define one or more wireless coverage areas within which BS 14 can wirelessly communicate with UE devices. The wireless coverage area defined by BS 14 could be a cell that generally surrounds BS 14. Alternatively, BS 14 may define multiple wireless coverage areas, such as sectors. Each sector may be defined by multiple antennas in BS 14 so as to generally correspond to a range of azimuthal angles (e.g., 120°) about BS 14.

For purposes of illustration, BS 14 is shown as being in wireless communication with UEs 16, 18, and 20 via respective air interfaces 22, 24, and 26. UEs 16, 18, and 20 could be wireless telephones, wireless handheld, tablet, or laptop computers, or other types of wireless communication devices. Although FIG. 1 shows BS 14 in wireless communication with three UEs, it is to be understood that BS 14 could be in wireless communication with a greater or fewer number of UEs. In addition, the number of UEs in wireless communication with BS 14 can change over time, for example, as a result of one or more UEs moving into or out of the wireless coverage area of BS 14 and/or as a result of one or more UEs beginning or ending communication sessions.

Air interfaces 22, 24, and 26 could use an FDD configuration in which uplink and downlink communications occur in separate frequency ranges. Further, the FDD may provide a sequence of designated time periods, such as a time sequence of consecutive subframes, for both uplink and downlink communications. For purposes of illustration, the communications over air interfaces 22, 24, and 26 will be described herein with respect to the LTE protocol. It is to be understood, however, that other wireless communication protocols could be used.

RAN 12 may provide access to one or more transport networks 28, which could include, for example, the public switched telephone network (PSTN) and/or the Internet or other packet-switched networks. With this arrangement, a UE device being served by BS 14 may engage in a communication session, via RAN 12, with an endpoint connected to one of transport networks 28. The endpoint could be, for example, another UE device, a landline telephone, an email server, Web server, media server, or gaming server. The communication session could involve voice, text, images, video, data, or other media that is transferred from the UE device to the endpoint and/or from the endpoint to the UE device.

Thus, when a UE device, such as UE 16, 18, or 20, is involved in a communication session, the UE may transmit data over an uplink channel to BS 14 and may receive data from BS 14 over a downlink channel. In some cases, the communication session could be one that involves a user of the UE device, such as a voice communication application or Web browsing application. In other cases, the communication session could involve a background task, such as periodically registering with wireless network 12. In some implementations, UEs 16, 18, and 20 may transmit data to BS 14 over an uplink shared channel. The usage of the uplink shared channel may be controlled by BS 14 or by some other entity in wireless network 12.

Figure 2A:
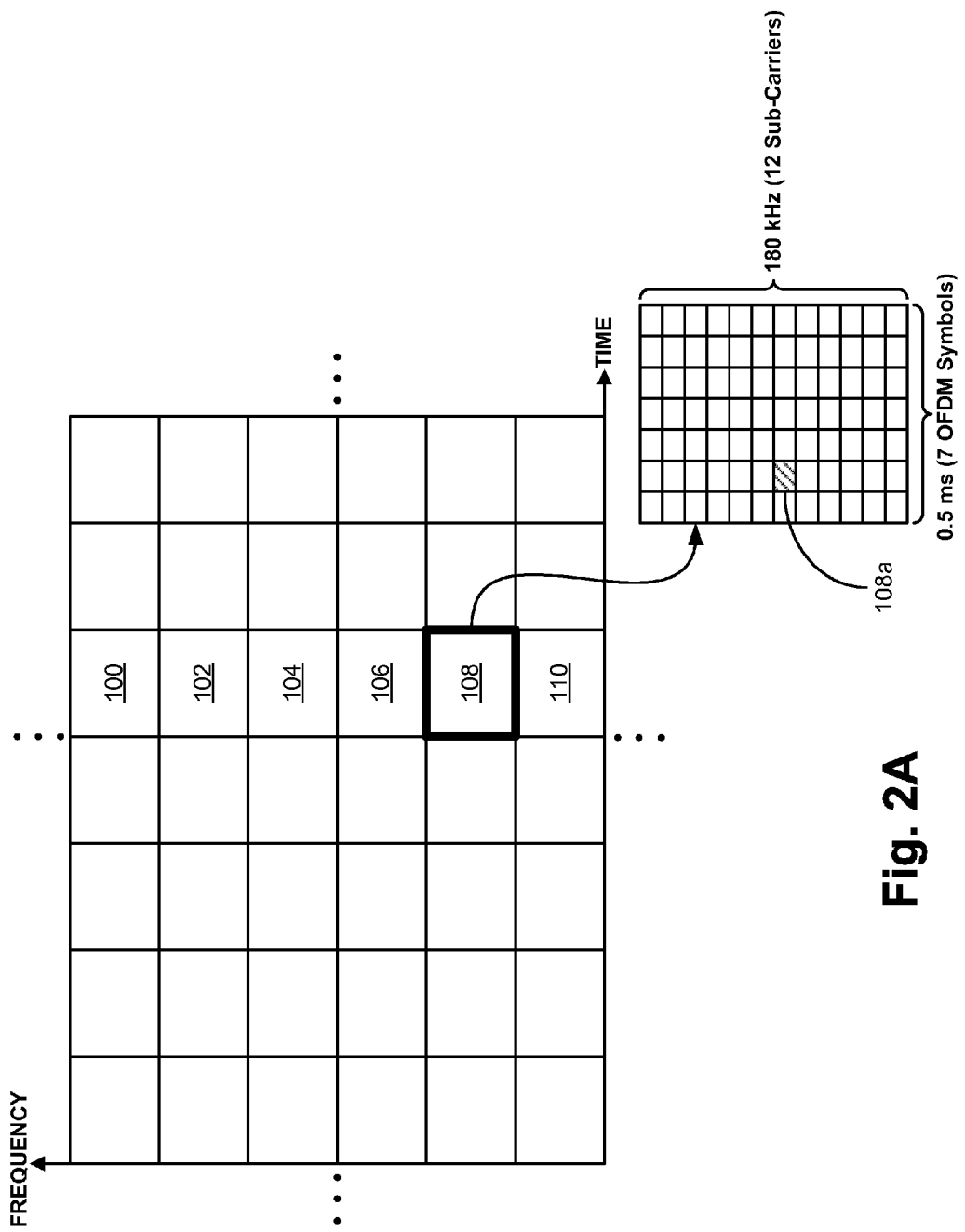
FIG. 2A is a conceptual illustration of a division of uplink resources into resource blocks, in accordance with an example embodiment.

For example, the LTE protocol defines a Physical Uplink Shared Channel (PUSCH) that UEs can use to transmit data to a base station and a Physical Downlink Shard Channel (PDSCH) that the base station can used to transmit data to the UEs. Portions of the PUSCH and the PDSCH may be allocated to particular UEs by allocating resource blocks. FIG. 2A illustrates how the uplink resources and the downlink resources in a given wireless coverage area may be divided in time and frequency domains into resource blocks. In an LTE air interface, data is transmitted on both the uplink and the downlink in the form of orthogonal frequency division multiplexing (OFDM) symbols. Each OFDM symbol is formed from a plurality of sub-carriers, typically 12 sub-carriers, each with a bandwidth of 15 kHz. Thus, a resource block corresponds to a plurality of sub-carriers that are used to form an OFDM symbol and has a duration that can accommodate a particular number of OFDM symbols.

In the time domain, each resource block typically occupies a 0.5 ms slot of time. By way of example, FIG. 2A shows resource blocks 100-110 for a particular slot. In the frequency domain, each of resource blocks 100-110 occupies a respective portion of frequency bandwidth, typically 180 kHz in LTE implementations. Although FIG. 2A shows six resource blocks in each slot, a wireless coverage area could have a greater number of resource blocks, as indicated by the dots above and below resource blocks 100-110.

FIG. 2A also includes a more detailed view of resource block 108. This detailed view shows that the 180 kHz of frequency bandwidth corresponds to 12 sub-carriers of 15 kHz each. Further, in this example, the 0.5 ms slot of time corresponds to the duration of seven OFDM symbols. In other examples, a 0.5 ms slot could correspond to a different number of OFDM symbols. Thus, a resource block may be described as a set of resource elements, with each resource element corresponding to one modulated sub-carrier in an OFDM symbol. The detailed view of uplink resource block 108 in FIG. 2A shows the division of the resource block into multiple resource elements, such as resource element 108*a*.

One or more uplink resource blocks may be allocated to a particular UE device to transmit data in the uplink shared channel (PUSCH). For example, resource blocks 100 and 102 might be allocated to UE 16, resource blocks 104-108 might be allocated to UE 18, and resource block 110 might be allocated to UE 20. The allocation of resource blocks to UEs could be made by BS 14 or by some other entity in wireless network 12. Similarly, one or more downlink resource blocks could be allocated to a particular UE device to receive data that is transmitted by the base station in the downlink shared channel (PDSCH).

Figure 2B:
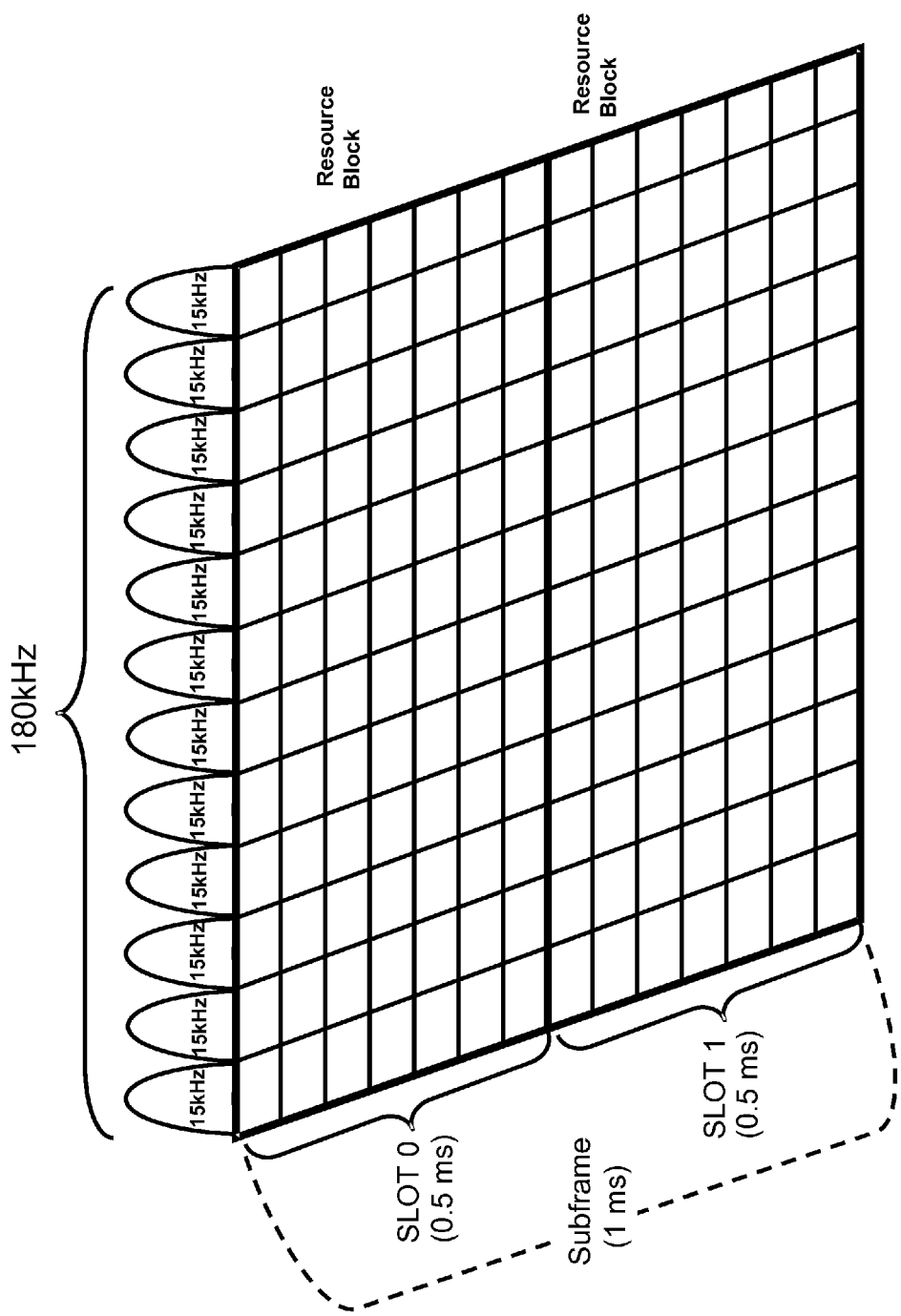
FIG. 2B is a conceptual illustration of two time-consecutive resource blocks, in accordance with an example embodiment.

FIG. 2B illustrates an uplink resource allocation for a UE that is maintained for two consecutive slots of time (Slot 0 and Slot 1) in a given subframe (a downlink resource allocation may be similar). The two consecutive slots of time are treated as a transmission time interval (TTI) for purposes of LTE's HARQ process. In particular, after a UE has transmitted its data in a TTI, such as shown in FIG. 2B, the UE waits to receive a HARQ response from the RAN to determine whether the data should be re-transmitted or whether the UE can transmit additional data. If the HARQ response is an ACK, indicating that the data was successfully received, then the UE can transmit additional data. If the HARQ response is a NACK, indicating that the data was received with one or more errors, then the UE re-transmits the data. The UE may also re-transmit the data if the UE does not receive a HARQ response within a predetermined period of time.

On the other hand, if a UE has been instructed to use TTI bundling, then the UE may transmit the same data in multiple TTIs before waiting for a HARQ response. The TTI bundle size is the number of TTIs that the UE uses to transmit the data. Thus, a TTI bundle size of N means that the UE transmits the same data N times. However, in accordance with the methods and apparatus described herein, the UE may transmit the data fewer than N times for a bundle size of N if the UE receives an acknowledgement of successful receipt of the data before completing the N transmissions of the data.

3. Example Methods

Figure 3:
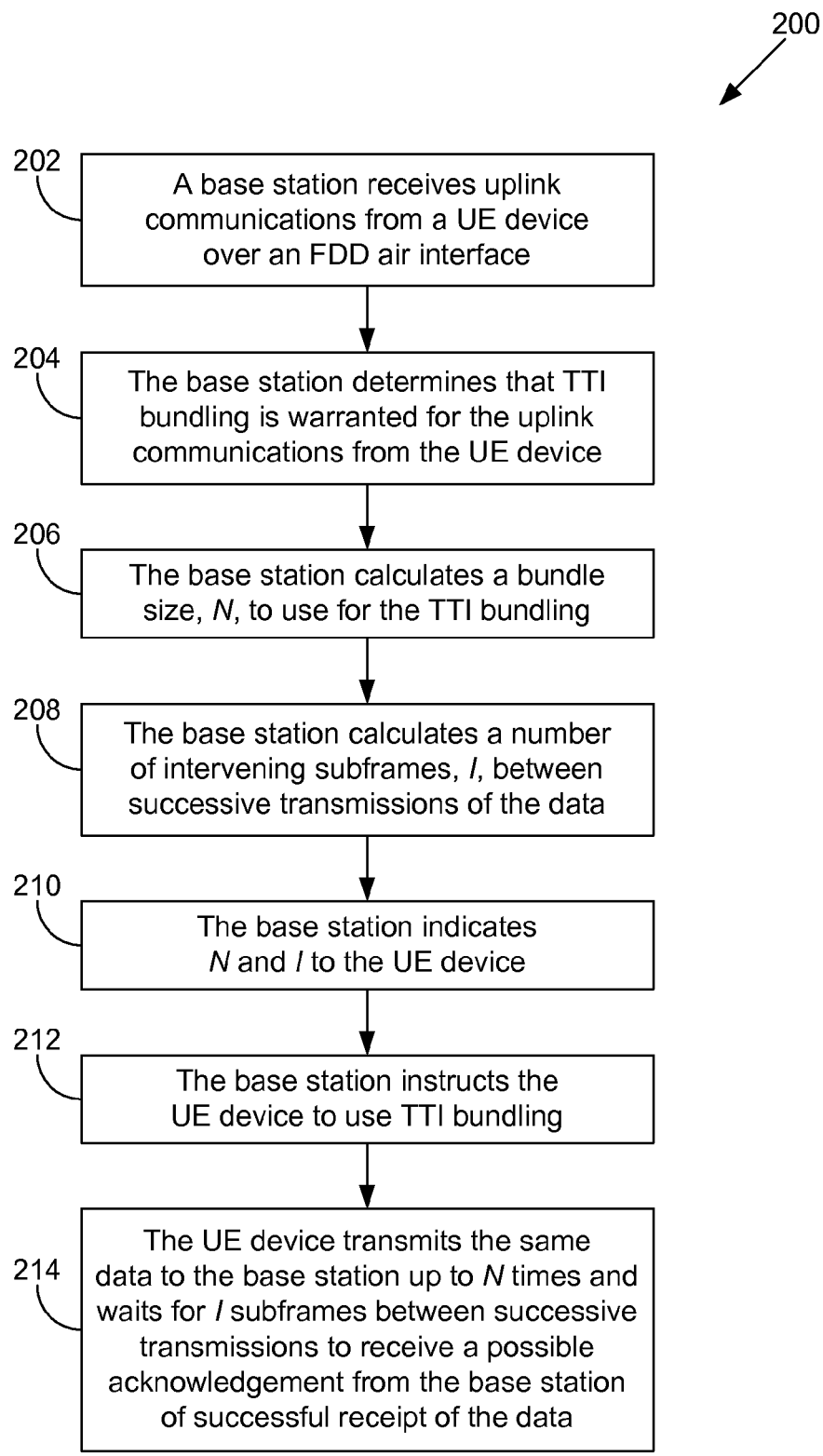
FIG. 3 is a flow chart of a method for uplink TTI bundling, in accordance with an example embodiment.
Figure 4:
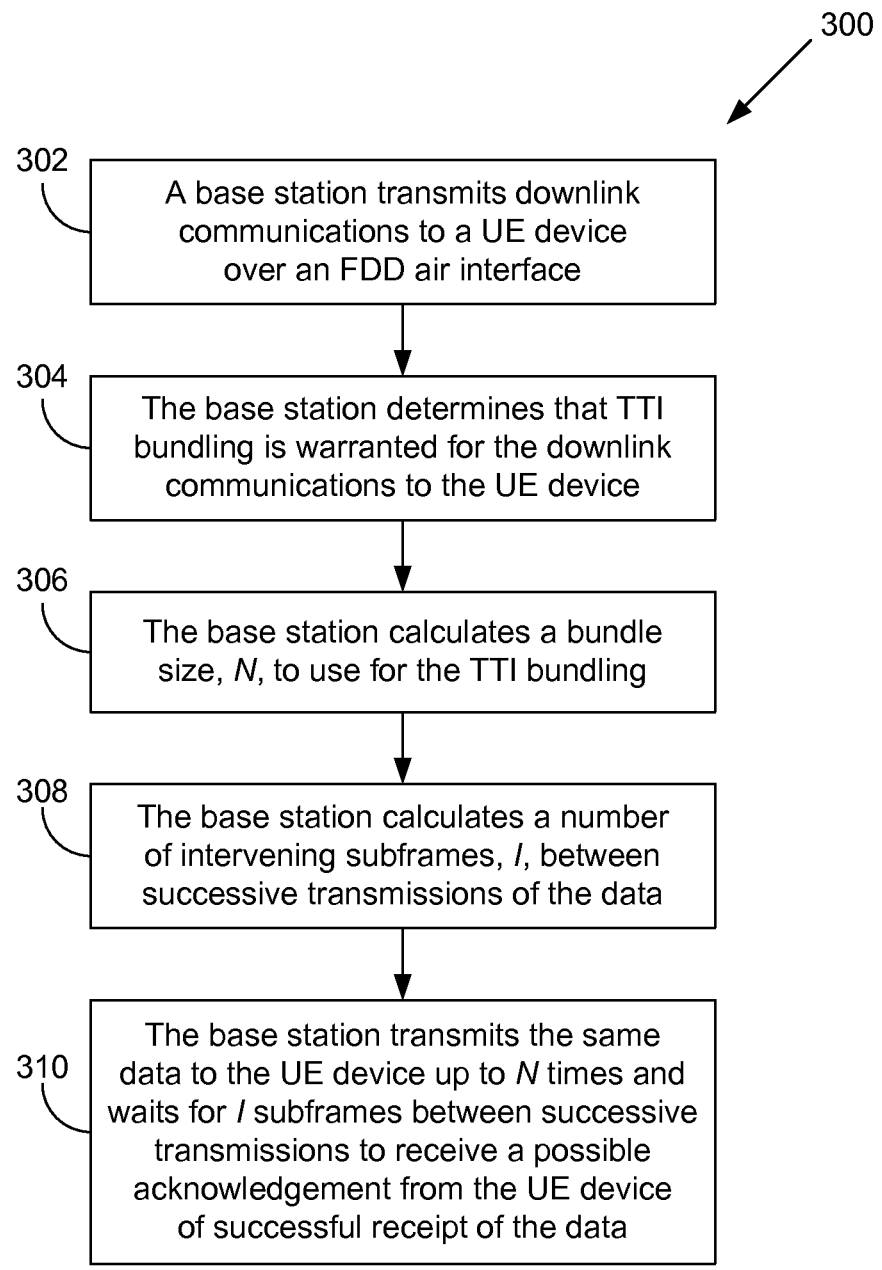
FIG. 4 is a flow chart of a method for downlink TTI bundling, in accordance with an example embodiment.
Figure 5:
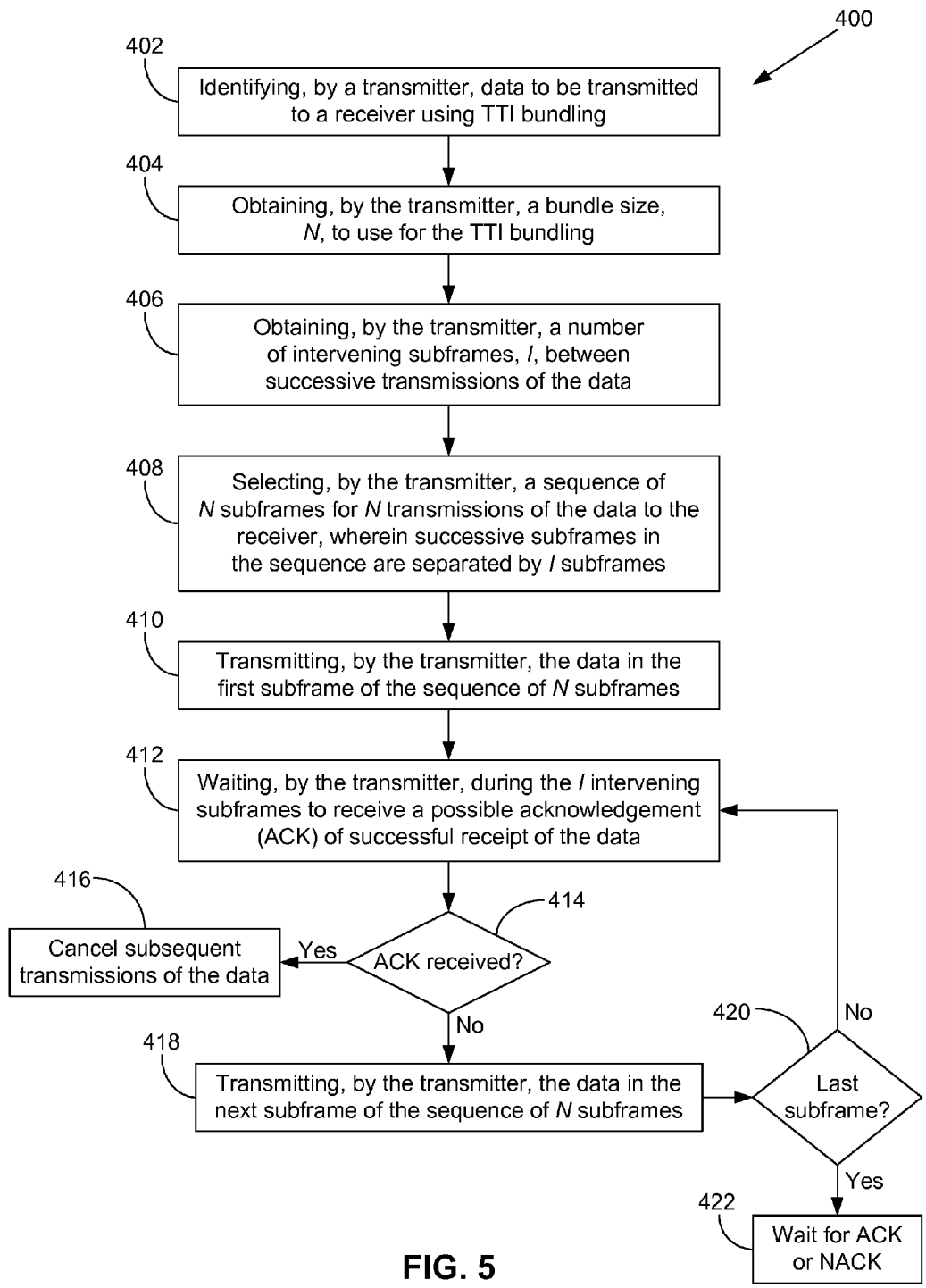
FIG. 5 is a flow chart of a method in which a transmitter selects and uses a sequence of N subframes to transmit data using TTI bundling, in accordance with an example embodiment.

FIGS. 3-5 are flow charts illustrating example methods relating to TTI bundling. FIG. 3 illustrates an example method of implementing TTI bundling for uplink communications. FIG. 4 illustrates an example method of implementing TTI bundling for downlink communications. FIG. 5 illustrates an example method of selecting a sequence of N subframes for N transmissions of the data (on either the uplink or the downlink) and using the sequence to transmit the data up to N times. For purposes of illustration, the example methods are described with reference to a communication system as shown in FIG. 1 and air interface resources as shown in FIGS. 2A and 2B. It is to be understood, however, that the methods could be applied to other types of communication systems and air interface resources.

FIG. 3 is a flowchart illustrating an example method 200 for implementing TTI bundling for uplink communications from a UE device (e.g., UE device 16) to a base station (e.g., base station 14). In this example, the base station receives uplink communications from the UE device over a FDD air interface (e.g., air interface 22), as indicated by block 202. The FDD air interface may provide a time sequence of consecutive subframes for both uplink and downlink communications, wherein the uplink and downlink communication occur in different frequency ranges. The uplink communications from the UE device to the base station could include voice, video, or other data and could be associated with a bearer that has a predefined quality of service (QoS). As one example, the UE device could use a bearer with a guaranteed bit rate to transmit voice. As another example, the UE device could use a bearer with a non-guaranteed bit rate for Web browsing. Other examples are possible as well.

At some point, the base station determines that TTI bundling is warranted for the uplink communications from the UE device, as indicated by block 204. In an example, the base station may determine whether TTI bundling is warranted for the UE device based on at least a power headroom report that is received from the UE device. In LTE, a UE device may calculate a "power headroom" as a difference between the UE device's transmit power requirement for its uplink resource allocation and the UE device's maximum transmit power. If the power headroom that a UE device reports is positive, indicating that the UE device's transmit power requirement is less than its maximum transmit power, then the base station may conclude that TTI bundling is not warranted for the UE device. If the power headroom that the UE device reports is negative, indicating that the UE device's transmit power requirement is more than its maximum transmit power, then the base station may determine that TTI bundling is warranted for the UE device. Other methods for determining whether TTI bundling is warranted could be used as well.

The base station calculates a bundle size, N, to use for the TTI bundling, as indicated by block 206. The base station also calculates a number of intervening subframes, I, between successive transmissions of the data, as indicated by block 208. The base station may calculate N and I based on one or more uplink TTI bundling parameters. In one example, the base station may use a function, $F_N$, to calculate N and may use a function $F_I$ to calculate I, as follows:

$$N = F_N(P_1, P_2, P_3) \quad (1)$$

$$I = F_I(P_1, P_2, P_3) \quad (2)$$

where $P_1$ is a signal-plus-interference-to-noise ratio (SINR) at the base station of a signal transmitted by the UE device, $P_2$ is a delay budget for transmission of the data, and $P_3$ is a utilization of the uplink shared channel.

The base station could determine $P_1$ (SINR) based on one or more measurements at the base station of signals transmitted by the UE device. In some examples, the base station may periodically measure the SINR of the UE's signals, and the base station could then determine $P_1$ based on one or more of those SINR measurements. Alternatively or additionally, the base station may measure the SINR of a signal transmitted by the UE device in response to determining that TTI bundling is warranted. In example embodiments, $F_N$ could decrease as a function of increasing $P_1$ (SINR). In this regard, a higher SINR could indicate a higher link quality between the UE device and base station, such that a smaller bundle size, N, may be sufficient. However, $F_I$ could increase with increasing $P_1$ (SINR). In this regard, a higher SINR may result in a higher probability that any given transmission of data will be successfully received. Thus, it may be beneficial to provide more time for the UE device to receive acknowledgement that the data has been successfully received.

The base station may determine $P_2$ (delay budget) based on the type of bearer being used by the UE device for the uplink communications. For example, a guaranteed bit rate bearer may have a relatively low delay budget, whereas a non-guaranteed bit rate bearer may have a relatively high delay budget. In example embodiments, $F_N$ and $F_I$ could both decrease as a function of decreasing $P_2$ (delay budget). In this regard, a lower delay budget may indicate a lower tolerance for delay, such that a smaller bundle size, N, and a fewer number of intervening subframes, I, may be beneficial in order to cause less transmission latency.

The base station may determine $P_3$ (utilization) based on how many of the uplink resource blocks that could be allocated by the base station to UE devices have already been allocated. In example embodiments, $F_N$ could decrease as a function of increasing $P_3$ (utilization). In this regard, uplink TTI bundling typically increases the utilization of the uplink shared channel. Thus, if the uplink shared channel is already heavily utilized, it may be beneficial for the base station to select a smaller bundle size, N, in order to conserve resources. However, $F_I$ could increase with increasing $P_3$ (utilization). In this regard, providing for more opportunity to cancel subsequent, unnecessary transmissions of the data can also conserve resources.

In some examples, $F_N$ may map the uplink TTI bundling parameters ($P_1$, $P_2$, $P_3$) to one of a plurality of values of N. The plurality of values of N could be, for example: N=2, N=3, and N=4. In other examples, $F_N$ may provide for a greater or fewer number of values of N and/or may allow N to be greater than 4. It is also to be understood that the particular set of three TTI bundling parameters given in equation (1) is meant to be exemplary only. N could alternatively be calculated based on additional and/or different parameters.

In some examples, $F_I$ may map the uplink TTI bundling parameters ($P_1$, $P_2$, $P_3$) to one of a plurality of values of I. The plurality of values of I could be, for example: I=1, I=2, and I=3. In other examples, $F_I$ may provide for a greater or fewer number of values of I and/or may allow I to be greater than 3. It is also to be understood that the particular set of three TTI bundling parameters given in equation (2) is meant to be exemplary only. I could alternatively be calculated based on additional and/or different parameters.

The base station indicates N and I to the UE device, as indicated by block 210. The base station also instructs the UE device to use TTI bundling, as indicated by block 212. In response, the UE transmits the same data to the base station up to N times and waits for I subframes between successive transmissions to receive a possible acknowledgement from the base station of successful receipt of the data, as indicated by block 214. As discussed below with reference to FIG. 5, the UE device may receive from the base station an acknowledgement of successful receipt of the data, before the UE device has transmitted the data to the base station N times. In such cases, the UE device may cancel subsequent transmissions of the data, with the result that the UE device transmits the data to the base station fewer than N times.

Although FIG. 3 shows steps of method 200 being performed in a particular order, it is to be understood that some of these steps could be performed in a different order and/or some of the steps could be omitted or combined. For example, FIG. 3 shows the base station calculating N (block 206) and calculating I (block 208) as occurring after the base station determines that TTI bundling is warranted (block 204). In some implementations, however, the base station may periodically calculate values of N and I for a UE device being served by the base station. The periodic calculations may occur before a determination that TTI bundling is warranted for the UE device, and the periodic calculations may continue after TTI bundling has been implemented. In this way, the base station may calculate different values of N and I as conditions change.

Along with the periodic calculations of N and I for a UE device, the base station may periodically indicate to the UE device the calculated values of N and I. In this way, when the base station subsequently determines that TTI bundling is warranted for the UE device, and instructs the UE device to use TTI bundling, the UE device may use the values of N and I that were previously indicated by the base station.

FIG. 4 is a flowchart illustrating an example method 300 for implementing TTI bundling for downlink communications from a base station (e.g., base station 14) to a UE device (e.g., UE device 16). In this example, the base station transmits downlink communications to the UE device over an FDD air interface (e.g., air interface 22), as indicated by block 302. The FDD air interface may provide a time sequence of consecutive subframes for both uplink and downlink communications, wherein the uplink and downlink communication occur in different frequency ranges. The downlink communications could include voice, video, or other data and could be associated with a bearer that has a predefined QoS.

At some point, the base station determines that TTI bundling is warranted for the downlink communications to the UE device, as indicated by block 304. The base station may make this determination, for example, based on an indication from the UE device that the downlink channel quality has degraded. In particular, the UE device may measure a signal transmitted by the base station and report one or more parameters relating to the signal strength or signal quality. Such parameters may include, for example, a reference signal received power (RSRP), a reference signal received quality (RSRQ), and/or a signal-plus-interference-plus-noise ratio (SINR).

The base station calculates a bundle size, N, to use for the TTI bundling, as indicated by block 306. The base station also calculates a number of intervening subframes, I, between successive transmissions of the data, as indicated by block 308. The base station may calculate N and I based one or more downlink TTI bundling parameters. In one example, the base station may use a function, $G_N$, to calculate N and may use a function $G_I$ to calculate I, as follows:

$$N = G_N(Q_1, Q_2, Q_3) \quad (3)$$

$$I = G_I(Q_1, Q_2, Q_3) \quad (4)$$

where $Q_1$ is a signal-plus-interference-to-noise ratio (SINR) at the UE device of a signal transmitted by the base station, $Q_2$ is a delay budget for transmission of the data, and $Q_3$ is a utilization of the downlink shared channel.

The base station could determine $Q_1$ (SINR) based on one or more measurements reported by UE device. For example, the UE device may periodically measure and report the SINR of the base station's signals. The base station could then determine $Q_1$ based on one or more of those SINR measurements. Alternatively or additionally, the UE device may measure the SINR of the base station's signal in response to an instruction from the base station. The base station may send such an instruction, for example, in response to determining that TTI bundling is warranted. In example embodiments, $G_N$ could decrease as a function of increasing $Q_1$ (SINR). In this regard, a higher SINR could indicate a higher link quality between the base station and UE device, such that a smaller bundle size, N, may be sufficient. However, $G_I$ could increase with increasing $Q_1$ (SINR). In this regard, a higher SINR may result in a higher probability that any given transmission of data will be successfully received. Thus, it may be beneficial to provide more time for the base station to receive acknowledgement that the data has been successfully received.

The base station may determine $Q_2$ (delay budget) based on the type of bearer being used for the downlink communications to the UE device. For example, a guaranteed bit rate bearer may have a relatively low delay budget, whereas a non-guaranteed bit rate bearer may have a relatively high delay budget. In example embodiments, $G_N$ and $G_I$ could both decrease as a function of decreasing $Q_2$ (delay budget). In this regard, a lower delay budget may indicate a lower tolerance for delay, such that a smaller bundle size, N, and a fewer number of intervening subframes, I, may be beneficial in order to cause less transmission latency.

The base station may determine $Q_3$ (utilization) based on how many of the downlink resource blocks that could be allocated by the base station to UE devices have already been allocated. In example embodiments, $G_N$ could decrease as a function of increasing $P_3$ (utilization). In this regard, downlink TTI bundling typically increases the utilization of the downlink shared channel. Thus, if the downlink shared channel is already heavily utilized, it may be beneficial for the base station to select a smaller TTI bundle size, N, in order to conserve resources. However, $G_I$ could increase with increasing $Q_3$ (utilization). In this regard, providing for more opportunity to cancel subsequent, unnecessary transmissions of the data can also conserve resources.

In some examples, $G_N$ may map the downlink TTI bundling parameters ($Q_1, Q_2, Q_3$) to one of a plurality of values of N. The plurality of values of N could be, for example: N=2, N=3, and N=4. In other examples, $G_N$ may provide for a greater or fewer number of values of N and/or may allow N to be greater than 4. It is also to be understood that the particular set of three TTI bundling parameters given in equation (3) is meant to be exemplary only. N could alternatively be calculated based on additional and/or different parameters.

In some examples, $G_I$ may map the downlink TTI bundling parameters ($Q_1, Q_2, Q_3$) to one of a plurality of values of I. The plurality of values of I could be, for example: I=1, I=2, and I=3. In other examples, $G_I$ may provide for a greater or fewer number of values of I and/or may allow I to be greater than 3. It is also to be understood that the particular set of three TTI bundling parameters given in equation (4) is meant to be exemplary only. I could alternatively be calculated based on additional and/or different parameters.

Once the base station has calculated N and I, the base station transmits the same data to the UE device up to N times and waits for I subframes between successive transmissions to receive a possible acknowledgement from the UE device of successful receipt of the data, as indicated by block 310. As discussed below with reference to FIG. 5, the base station may receive from the UE device an acknowledgement of successful receipt of the data, before the base station has transmitted the data to the UE device N times. In such cases, the base station may cancel subsequent transmissions of the data, with the result that the base station transmits the data to the UE device fewer than N times.

Although FIG. 4 shows steps of method 300 being performed in a particular order, it is to be understood that some of these steps could be performed in a different order and/or some of the steps could be omitted or combined. For example, FIG. 4 shows the base station calculating N (block 306) and calculating I (block 308) as occurring after the base station determines that TTI bundling is warranted (block 304). In some implementations, however, the base station may periodically calculate values of N and I for a UE device being served by the base station. The periodic calculations may occur before a determination that TTI bundling is warranted for the downlink communications to the UE device, and the periodic calculations may continue after TTI bundling has been implemented. In this way, the base station may calculate different values of N and I as conditions change.

FIG. 5 illustrates an example method 400 in which a transmitter selects and uses a sequence of N subframes for transmitting data using TTI bundling. Method 400 refers to functions that are performed by a transmitter in relation to data that is to be transmitted from the transmitter to a receiver. In some examples, the transmitter could be a UE device and the receiver could be a base station, in which case method 400 may be performed in conjunction with method 200 shown in FIG. 3. In other examples, the transmitter could be a base station and the receiver could be a UE device, in which case method 400 may be performed in conjunction with method 300 shown in FIG. 4.

Method 400 may begin with identifying, by the transmitter, data to be transmitted to the receiver using TTI bundling, as indicated by block 402. Thus, at this point, it has been determined that TTI bundling is warranted for the transmitter. In some examples, the decision that TTI bundling is warranted is made by a base station, for both downlink communications from the base station to a UE device and for uplink communications from a UE device to the base station. Thus, in the case that the transmitter is a UE device, the data to be transmitted to the base station using TTI bundling may be identified after the UE device has received an instruction from the base station to use TTI bundling.

Method 400 may continue with obtaining, by the transmitter, a bundle size, N, for the TTI bundling, as indicated by block 404. In the case that the transmitter is a UE device, the value of N could be obtained by the UE device from the base station. For example, the base station may calculate N, such as by using equation (1) described above, and transmit an indication of the value of N to the UE device. In the case that the transmitter is a base station, the bundle size, N, may be obtained by the base station calculating N, such as by using equation (3) described above.

Method 400 may further continue with obtaining, by the transmitter, a number of intervening subframes, I, between successive transmissions of the data, as indicated by block 406. In the case that the transmitter is a UE device, the value of I could be obtained by the UE device from the base station. For example, the base station may calculate I, such as by using equation (2) described above, and transmit an indication of the value of I to the UE device. In the case that the transmitter is a base station, the number of intervening subframes, I, may be obtained by the base station calculating I, such as by using equation (4) described above.

Method 400 then involves selecting, by the transmitter, a sequence of N subframes for N transmissions of the data to the receiver, wherein successive subframes in the sequence are separated by I subframes, as indicated by block 408. Whether the transmitter actually transmits the data N times in the N subframes of the sequence depends on whether or not the transmitter receives, before completing the N transmissions, an acknowledgement from the receiver that the data has been successfully received. The transmitter could receive such an acknowledgement after transmitting the data only one time, only two times, or in general after transmitting the data only M times, where M<N). The transmitter may receive the acknowledgement in one of the I intervening subframes between successive transmissions of data. In response to receiving the acknowledgement, the transmitter may cancel subsequent transmissions of the data.

Thus, method 400 involves transmitting, by the transmitter, the data in the first subframe of the sequence of N subframes, as indicated by block 410. Thereafter, method 400 involves waiting, by the transmitter, during the I intervening subframes to receive a possible acknowledgement (ACK) of successful receipt of the data, as indicated by block 412.

How method 400 proceeds depends on whether the transmitter receives the acknowledgement during one of the I intervening subframes, as indicated by block 414. If the transmitter does receive such an acknowledgement, then the transmitter cancels subsequent transmissions of the data, as indicated by block 416. If not, method 400 proceeds with transmitting, by the transmitter, the data in the next subframe of the sequence of N subframes, as indicated by block 418.

Method 400 may further continue, depending on whether the subframe used to transmit the data in block 418 is the last subframe of the sequence of N subframes (i.e., whether the subframe used in block 418 is subframe N of the sequence of N subframes), as indicated by block 420. If the subframe used in block 418 is the last subframe of the sequence, then the transmitter waits to receive either an ACK or NACK, as indicated by block 422. How long the transmitter waits may depend on parameters of the HARQ procedure used in the particular system, rather than on the value of I used by the transmitter.

If the subframe used in block 418 is not the last subframe of the sequence, then the transmitter waits to receive an acknowledgement of successful receipt of the data during the I intervening subframes between the subframe used in block 418 and the next subframe of the sequence of N subframes. Thus, method 400 loops back from block 420 to block 412, as shown in FIG. 5.

In this way, a transmitter following method 400 will transmit the same data in each subframe of the sequence of N subframes until one of the following occurs: (1) the transmitter receives, during one of the I intervening subframes, an acknowledgement of successful receipt of the data, in which case the transmitter cancels subsequent transmissions of the data; or (2) the transmitter has transmitted the data in each of the N subframes of the sequence. Put another way, after transmitting the data in a subframe M of the sequence of N subframes (where M<N), the transmitter waits to receive an acknowledgement of successful receipt of the data during the I subframes between subframe M and subframe M+1 of the sequence of N subframes. In response to receiving such an acknowledgement, the transmitter cancels transmission of the data in each subframe of the sequence of N subframes occurring after subframe M. If the transmitter does not receive such an acknowledgement, the transmitter transmits the data in subframe M+1 of the sequence of sequence of N subframes.

FIGS. 6-9 illustrate four different scenarios in which a transmitter, such as a UE device, transmits data in uplink subframes to a receiver using TTI bundling. In each of FIGS. 6-8, a time sequence of both uplink subframes and downlink subframes in an FDD configuration is illustrated. The uplink and downlink subframes occur substantially simultaneously but in different frequency ranges. Each time period (e.g., a 1 millisecond time period) corresponding to an uplink and downlink subframe is labeled with a number from "1" to "12." Although only 12 subframes are shown for purposes of illustration, it is to be understood that the transmitter and receiver may communicate in subframes occurring before subframe 1 and may communicate in subframes occurring after subframe 12. Although FIGS. 6-9 illustrates scenarios in which TTI bundling is used for uplink communications, it is to be understood that scenarios in which TTI bundling is used for downlink communications can be similar.

Figure 6:
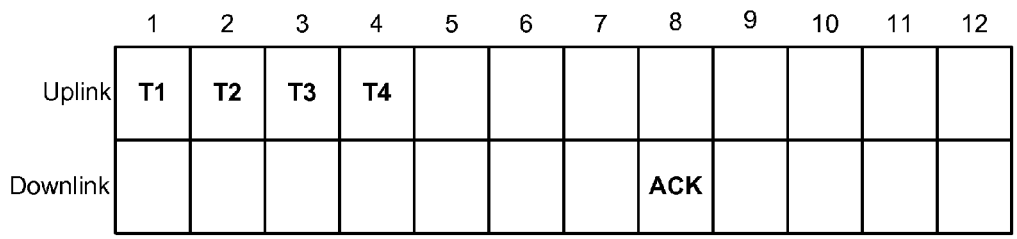
FIG. 6 illustrates an uplink TTI bundling scenario, in accordance with an example embodiment.

FIG. 6 illustrates a scenario in which conventional TTI bundling is used with a bundle size, N=4. Thus, the transmitter transmits the same data in four consecutive subframes, indicated by transmissions T1 through T4 in uplink subframes 1-4. Conventionally, the receiver waits a fixed period of time after completion of all four data transmissions before transmitting either an ACK (indicating that the data was received successfully) or a NACK (indicating that the data was not received successfully). In this case, the receiver does receive the data successfully and transmits an ACK in downlink subframe 8.

Figure 7:
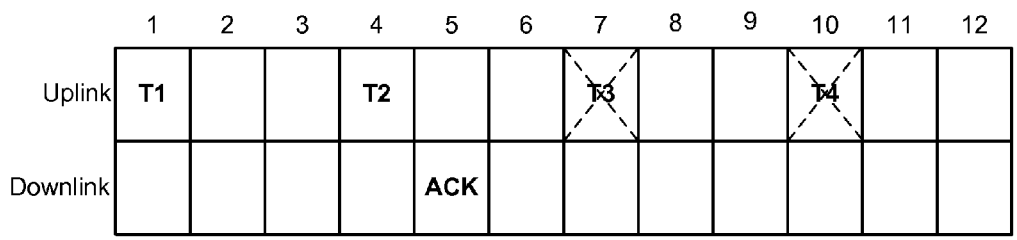
FIG. 7 illustrates an uplink TTI bundling scenario, in accordance with an example embodiment.
Figure 8:
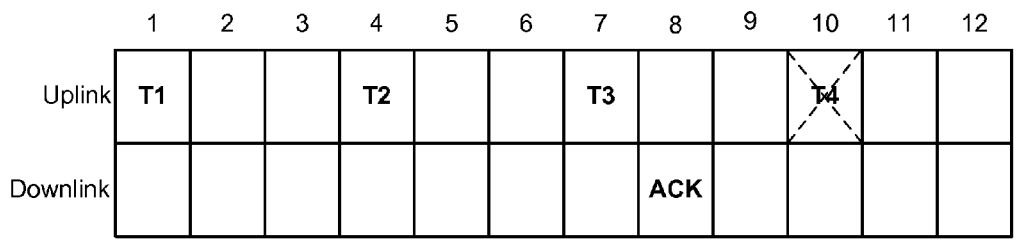
FIG. 8 illustrates an uplink TTI bundling scenario, in accordance with an example embodiment.
Figure 9:
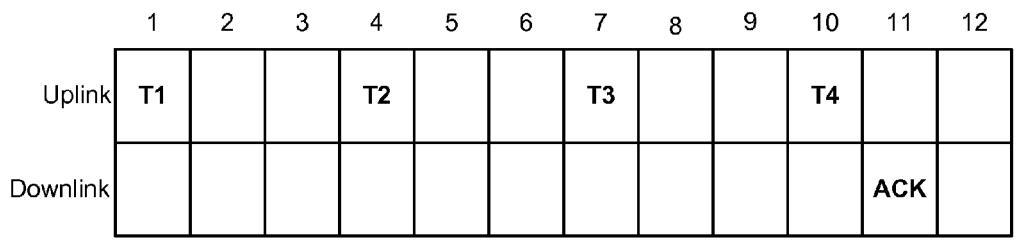
FIG. 9 illustrates an uplink TTI bundling scenario, in accordance with an example embodiment.

However, there is a certain probability that any given transmission of the data (i.e., any of transmissions T1 through T4) will be successfully received by the receiver. Thus, it may be beneficial to allow time for the receiver to transmit an ACK before the transmitter has transmitted the data all four times. For example, FIGS. 7-9 illustrate scenarios in which the bundle size is four (N=4), but the transmitter waits for two intervening subframes between each transmission of the data (I=2). Thus, in these scenarios, the transmitter selects a sequence of four subframes (uplink subframes 1, 4, 7, and 10) for the four transmissions of the data (transmissions T1 through T4).

In the scenario of FIG. 7, the transmitter completes only the first two transmissions of the data (transmissions T1 and T2). This is because the receiver successfully receives the data in the first transmission (i.e., transmission T1 in uplink subframe 1) and transmits an ACK in downlink subframe 5, which is one of the intervening subframes between transmission T2 and transmission T3. In response to receiving the ACK, the transmitter cancels the subsequent data transmissions (transmissions T3 and T4). Thus, as compared to the scenario of FIG. 6, the scenario of FIG. 7 provides some of the advantages of TTI bundling but with less latency (the ACK is received sooner) and with less usage of uplink resources (two uplink subframes are used instead of four).

FIG. 8 illustrates another scenario in which N=4 and I=2. In this scenario, the receiver successfully receives the data in the second transmission (i.e., transmission T2 in uplink subframe 4) and transmits an ACK in downlink subframe 8. The transmitter receives the ACK and cancels the subsequent data transmission (transmission T4). Thus, like the scenario of FIG. 6, the scenario of FIG. 8 results in an ACK being transmitted in downlink subframe 8, but with less usage of uplink resources (three uplink subframes are used instead of four). FIG. 9 illustrates yet another scenario in which N=4 and I=2. In this scenario, the receiver successfully receives the data in the third transmission (i.e., transmission T3 in uplink subframe 7) and transmits an ACK in downlink subframe 11. Thus, as compared to the scenario of FIG. 6, the scenario of FIG. 9 has the same usage of uplink resources but results in more latency.

As the scenarios of FIGS. 6-9 illustrate, the approach of including one or more intervening subframes between successive transmission of data in TTI bundling can provide advantages over conventional TTI bundling (in which consecutive subframes are used) in the form of less latency and/or less utilization of uplink or downlink resources.

4. Example Apparatus

Figure 10:
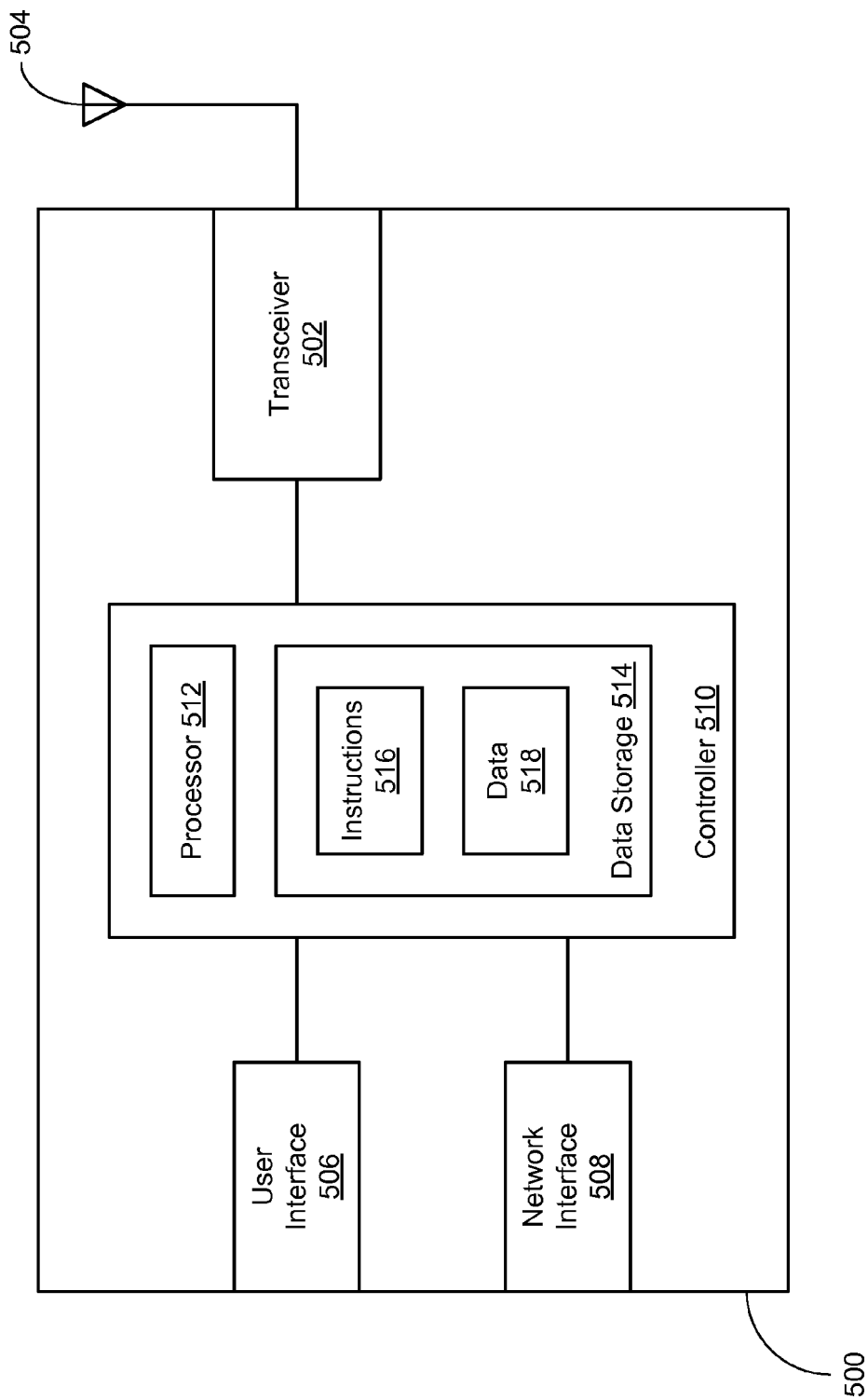
FIG. 10 is a block diagram of an apparatus, in accordance with an example embodiment.

FIG. 10 illustrates an example apparatus 500, which could correspond to either a base station or a UE device, for example, as described above in relation to any of FIGS. 1-9. Apparatus 500 includes a transceiver 502 that can transmit and receive wireless communications via one or more antennas, exemplified by antenna 504. The wireless communications may include uplink communications in an uplink shared channel and downlink communications in a downlink shared channel. The uplink and downlink shared channels may each be divided in time and frequency domains into a plurality of resource blocks, for example, as described above in relation to FIGS. 2A and 2B. The uplink and downlink communications may occur in different frequency ranges in accordance with an FDD configuration.

The wireless communications transmitted and/or received by transceiver 502 may include voice, video, or other data. At least some of the data transmitted or received transceiver 502 may relate to data that is input into apparatus 500 or data that is output from apparatus 500 via one or more interfaces. In some examples (particularly in the case that apparatus 500 is a UE device), apparatus 500 may include a user interface 506. User interface 506 may include a display configured to convey textual, graphical, or other visual information to a user of apparatus 500. User interface 506 may also include a touch screen, keyboard, buttons, and/or other means configured to receive input from a user of apparatus 500. User interface 506 may further include audio input and output means, such as a microphone to receive voice or other audio from a user of apparatus 500 and a speaker to convey voice or other audio to the user.

In some examples (particularly in the case that apparatus is a base station), apparatus 500 may include a network interface 508. Apparatus 500 may use network interface 508 to communicate with one or more entities, such as entities in RAN 12, via wired or wireless connections.

The operations of apparatus 500 may be controlled by a controller 510, which, in turn, may be coupled to other elements of apparatus, such as transceiver 502, user interface 506, and/or network 508. Controller 510 could be implemented using hardware, software, and/or firmware. In an example embodiment, controller 510 includes a processor 512 and data storage 514. Data storage 514 may include any type of non-transitory computer readable medium, such as random access memory (RAM), read-only memory (ROM), flash memory, cache memory, one or more magnetically encoded disks, one or more optically encoded disks, and/or any other type of volatile or non-volatile memory. Data storage 514 may store instructions 516 and data 518. Instructions 516 could be executable program instructions that, when executed by processor 512, cause apparatus 500 to perform functions, such as any of the functions described herein. Data 518 may include, for example, values of N and I used for TTI bundling, and/or any other type of data that may be generated or used by controller 510.

In one example, controller 510 may be configured (e.g., by instructions 516 stored in data storage 514 and executable by processor 512) to perform the following functions: (a) identifying data to be transmitted to a receiver using TTI bundling; (b) obtaining a bundle size, N, to use for the TTI bundling (e.g., by receiving an indication of N from a base station or by calculating N), wherein N>1; (c) obtaining a number of intervening subframes, I, between successive transmissions to the receiver (e.g., by receiving an indication of I from a base station or by calculating I), wherein I≥1; (d) selecting a sequence of N subframes for N transmissions of data to the receiver, wherein successive subframes of the sequence are separated by I subframes; and (e) transmitting, via the transceiver 502, the data in at least a first subframe of the sequence of N subframes.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for wireless communication in a wireless communication network using a frequency division duplexing (FDD) configuration, wherein the FDD configuration provides a time sequence of consecutive subframes for both uplink and downlink communications in which the uplink and downlink communications occur in different frequency ranges, the method comprising:
 identifying, by a transmitter, data to be transmitted to a receiver using transmission time interval (TTI) bundling;
 obtaining, by the transmitter, a bundle size, N, to use for the TTI bundling, wherein N>1;
 obtaining, by the transmitter, a number of intervening subframes, I, between successive transmissions of the data to the receiver, wherein I≥1;

selecting, by the transmitter, a sequence of N subframes for N transmissions of the data to the receiver, wherein successive subframes in the sequence are separated by I subframes; and transmitting, by the transmitter, the data in at least a first subframe of the sequence of N subframes, wherein transmitting, by the transmitter, the data in at least a first subframe of the sequence of N subframes comprises:

transmitting, by the transmitter, the data in subframe M of the sequence of N subframes, wherein M<N;

receiving, by the transmitter, an acknowledgement indicating that the receiver has successfully received the data, wherein the acknowledgement is received by the transmitter during the I subframes between subframe M and subframe M+1 of the sequence of N subframes; and in response to receiving the acknowledgement, the transmitter cancelling transmission of the data in each subframe of the sequence of N subframes occurring after subframe M.

2. The method of claim 1, wherein the transmitter is configured to transmit data to the receiver over a shared channel.

3. The method of claim 2, wherein N and I are based on at least one of a signal-to-interference-plus-noise ratio (SINK) at the receiver of a signal transmitted by the transmitter, a delay budget for transmission of the data to the receiver, and a utilization of the shared channel.

4. The method of claim 3, wherein the transmitter is a user equipment (UE) device, the receiver is a base station, and the shared channel is an uplink shared channel.

5. The method of claim 4, wherein obtaining, by the transmitter, a bundle size, N, to use for the TTI bundling, comprises:

receiving, by the UE device, an indication of N from the base station.

6. The method of claim 5, wherein obtaining, by the transmitter, a number of intervening subframes, I, between successive transmissions of the data to the receiver comprises:

receiving, by the UE device, an indication of I from the base station.

7. The method of claim 6, wherein N and I are calculated by the base station as a function of at least one of a SINR at the base station of a signal transmitted by the UE device, a delay budget for transmission of the data to the base station, and a utilization of the uplink shared channel.

8. The method of claim 3, wherein the transmitter is a base station, the receiver is a user equipment (UE) device, and the shared channel is a downlink shared channel.

9. The method of claim 8, wherein obtaining, by the transmitter, a bundle size, N, to use for the TTI bundling, comprises:

calculating, by the base station, N as a function of at least one of a SINR at the UE device of a signal transmitted by the base station, a delay budget for transmission of the data to the UE device, and a utilization of the downlink shared channel.

10. The method of claim 9, wherein obtaining, by the transmitter, a number of intervening subframes, I, between successive transmissions of the data to the receiver comprises:

calculating, by the base station, I as a function of at least one of a SINR at the UE device of a signal transmitted by the base station, a delay budget for transmission of the data to the UE device, and a utilization of the downlink shared channel.

11. An apparatus, comprising:

a transceiver for transmitting and receiving wireless communications according to a frequency division duplexing configuration (FDD), wherein the FDD configuration provides a time sequence of consecutive subframes for both uplink and downlink communications in which the uplink and downlink communications occur in different frequency ranges;

a processor;

data storage;

program instructions stored in the data storage and executable by the processor to cause the apparatus to perform functions, the functions comprising:

identifying data to be transmitted to a receiver using transmission time interval (TTI) bundling;

obtaining a bundle size, N, to use for the TTI bundling, wherein N>1;

obtaining a number of intervening subframes, I, between successive transmissions of the data to the receiver, wherein I≥1;

selecting a sequence of N subframes for N transmissions of the data to the receiver, wherein successive subframes in the sequence are separated by I subframes; and transmitting, via the transceiver, the data in at least a first subframe of the sequence of N subframes, wherein transmitting, via the transceiver, the data in at least a first subframe of the sequence of N subframes comprises:

transmitting, via the transceiver, the data in subframe M of the sequence of N subframes, wherein M<N;

receiving, via the transceiver, an acknowledgement indicating that the receiver has successfully received the data, wherein the acknowledgement is received by the transmitter during the I subframes between subframe M and subframe M+1 of the sequence of N subframes; and in response to receiving the acknowledgement, cancelling transmission of the data in each subframe of the sequence of N subframes occurring after subframe M.

12. The apparatus of claim 11, wherein the apparatus comprises a user equipment (UE) device and the receiver comprises a base station of a wireless communication network.

13. The apparatus of claim 12, wherein obtaining a bundle size, N, to use for the TTI bundling comprises receiving, via the transceiver, an indication of N from the base station, and wherein obtaining a number of intervening subframes, I, between successive transmissions of the data comprises receiving, via the transceiver, an indication of I from the base station.

14. The apparatus of claim 11, wherein the apparatus comprises a base station of a wireless communication network and the receiver comprises a user equipment (UE) device.

15. The apparatus of claim 14, wherein the functions further comprise:

calculating N and I based on at least one of a SINR at the UE device of a signal transmitted by the base station, a delay budget for transmission of the data to the UE device, and a utilization of a downlink shared channel.

* * * * *